United States Patent Office 2,785,191
Patented Mar. 12, 1957

2,785,191

ACYLMERCAPTO-ALKYLAMINES AND PROCESS FOR THE MANUFACTURE THEREOF

Robert Schwyzer, Riehen, Switzerland, assignor to Ciba Pharmaceutical Products, Inc., Summit, N. J.

No Drawing. Application June 23, 1953,
Serial No. 363,649

Claims priority, application Switzerland July 3, 1952

4 Claims. (Cl. 260—455)

The present invention relates to a process for the manufacture of N:S-diacyl-mercapto-alkylamines which can be represented by the general formula R—NH—Alkylene—S—R₁    (I)

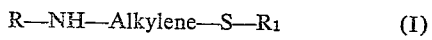

in which R represents the residue of an acid, e. g., an aliphatic or cyclic, e. g., aromatic or heterocyclic carboxylic acid acyl or sulphonic acid acyl, and R₁ represents a carboxylic acid acyl. R and R₁ are, for example, more particularly the residues of acetic acid, propionic acid, dichloracetic acid, succinic acid, pantothenic acid, benzoic acid, nicotinic acid or isonicotinic acid. The alkylene residue may be a straight or branced chain. Advantageously it is an ethylene residue.

The present invention also embraces new N:S-diacyl-mercapto-alkylamines of the formula R₂—NH—alkylene—S—R₃    (II)

in which R₂ represents a sulphonic acid acyl, a cyclic carboxylic acid acyl or an aliphatic carboxylic acid acyl having at least 6 carbon atoms and R₃ represents a carboxylic acid acyl.

Of special importance are alkylamines of Formula II in which R₂ represents the pantothenyl radical which can be represented by the formula

HO—CH₂—C(CH₃)₂—CHOH—
                      CO—NH—CH₂—CH₂—CO

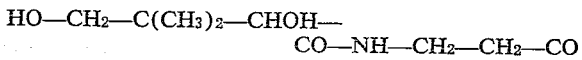

and R₃ represents carboxylic acid acyl.

The compounds of the invention are useful as medicaments or as intermediate products, e. g., for the manufacture of medicaments. More particularly, compounds of the present invention are useful as metabolites. Thus N-pantothenyl-S-benzoyl-β-mercapto - ethylamine which, unlike pantetheine, crystallizes readily and melts at 116° C., promotes equally well the growth of, e. g., the lactic acid bacteria *Lactobacillus helveticus* and *Lactobacillus bulgaricus*.

The compounds obtainable by the instant process are also of outstanding importance because the acyl attached to the sulphur atom can easily be split off selectively. Furthermore, the compounds are especially suited for the introduction of acyl radicals into compounds containing active hydrogen. The selective deacylation can be carried out with a compound containing active hydrogen, for example, it is advantageously brought about with ammonia or a compound containing amino groups such as an amine, an amino-carboxylic acid or a hydroxylamine. Unexpectedly the corresponding acid amide is formed in addition to the mercapto-compound. The deacylation may, however, be carried out with a compound containing active hydrogen in the form of hydroxyl groups, such as water or an alcohol.

The process of the present invention comprises reacting an N-acyl-alkylene-imine with a thiocarboxylic acid. The reaction may be carried out in the presence of an organic diluent, such as ether, benzene, toluene, dimethylformamide or in the presence of water. It takes place at low temperatures, and it is of advantage to work at room temperature.

The reaction may be represented by the following equation starting, for example, from an N-acyl-alkylene-imine and deacylating, for example, with an amino-compound:

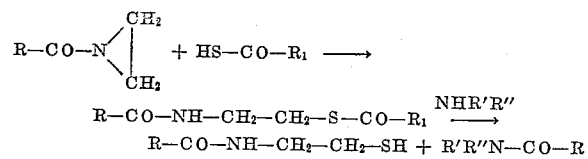

R and R₁ in the above equations have the same meaning as hereinabove indicated, and R′R″NH stands for an amine. The N-acyl-alkylene-imines can be prepared by a new process which is also embraced within the present invention. The novel process comprises reacting an anhydride of a carbonic acid semi-ester and an organic acid with an alkylene-imine in the presence of an acid-binding agent, for example, a tertiary amine. The reaction can be represented by the following equation:

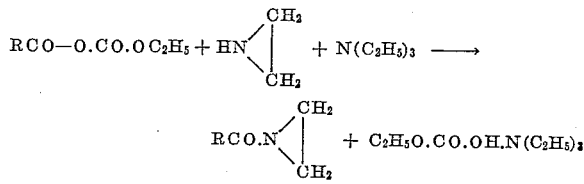

wherein R has the same meaning as defined above.

The following examples illustrate the invention, the parts being by weight unless otherwise stated, and the relationship of parts by weight to parts by volume being the same as that of the gram to the cubic centimeter:

*Example 1*

20 parts of thioacetic acid are stirred into a solution of 20 parts of N-acetyl-ethylene-imine in 100 parts by volume of benzene at 0–5° C. After ½ hour at room temperature, the solvent is removed and the residue is subjected to distillation in vacuo. At 160–165° C. under 10 mm. pressure of mercury 26.2 parts (=72 percent of the theoretical yield) of N:S-diacetyl-β-mercapto-ethyl-amine of the formula

CH₃CO—NH—CH₂—CH₂—S—COCH₃

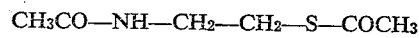

distil over. After a further distillation the product is pure and melts at 28° C.

By shaking enough of the compound to cover the tip of a spatula with a small crystal of hydroxylamine hydrochloride for a short time at room temperature with water and 1 N-solution of caustic soda, and pouring the whole into a solution of a small amount of FeCl₃ mixed with an excess of hydrochloric acid, the characteristic red coloration of acetyl-hydroxamic acid (CH₃CO.NHOH)

is produced immediately.

By dissolving a test portion of the compound in water, mixing it with two drops of sodium nitroprusside solution of 1 percent strength and two drops of a 1 N-solution of ammonia, there is produced after a short initial period an increasing blue-red coloration, which increases as N-acetyl-β-mercapto-ethylamine (CH₃CO—NH—CH₂—CH₂—SH)

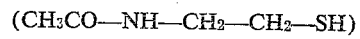

is liberated by the ammonia.

By maintaining 1 part of N:S-diacetyl-mercapto-ethylamine with 1 part of aniline in 100 parts by volume of water (pH=3) for 48 hours at room temperature, 0.25 part of acetanilide (C₆H₅NH·COCH₃), melting at 114° C., can be isolated at the end of this period by agitation with chloroform and washing with sodium carbonate solution, hydrochloric acid solution and water.

After maintaining 1.6 parts of N:S-diacetyl-β-mercapto-ethylamine with 0.75 part of glycine in 2 parts by volume of 0.5-n sodium hydroxide solution for 48 hours at 20° C., 0.45 part of N-acetyl-glycine (=38.5% of the theoretical amount) can be isolated on evaporation of the solvent and acidification with dilute hydrochloric acid, melting at 206° C.

By means of an analogous mixture using 1 part of para-amino-benzoic acid and 1 part of N:S-diacetyl-mercapto-ethylamine there is obtained 0.5 part of crystalline para-acetylaminobenzoic acid in a pure form melting at 256° C.

*Example 2*

In exactly the same manner as described in Example 1 in the case of N:S-diacetyl-β-mercapto-ethylamine, there are obtained from 10 parts of N-acetyl-ethylene-imine and 20 parts of thiobenzoic acid, 20 parts (=ca. 75%) N-acetyl-S-benzoyl-mercapto-ethylamine of the formula $$CH_3-CO-NH-CH_2-CH_2-S-CO-C_6H_5$$

melting at 87° C.

This compound reacts with $NH_3$, $NH_2OH$ and amino-compounds in a manner analogous to N:S-diacetyl-β-mercapto-ethylamine.

*Example 3*

1.23 parts of nicotinic acid are dissolved in dimethylformamide and the solution is mixed with 1.01 parts of triethylamine. 1.08 parts of ethyl chloroformate dissolved in ethyl acetate are then added, while stirring, at 0° C. After 10 minutes the mixture is filtered to separate the precipitated triethylammonium chloride, and the filtrate, containing the anhydride of nicotinic acid and ethoxy-formic acid, is introduced dropwise into a mixture of 0.460 part of ethylene-imine and 1.1 parts of triethylamine in ethyl acetate at 0° C. After ½ hour N-nicotinyl-ethylene-imine and trimethyl-ammonium ethoxy-formate are formed.

In order to prepare N-nicotinyl-S-benzoyl-mercaptoethylamine, 1.5 parts of thiobenzoic acid are added to the solution, which contains N-nicotinyl-ethylene-imine. The mixture is freed from solvent in vacuo and the residue is taken up in benzene and washed with a 2 N-solution of sodium carbonate and with water. By evaporating the benzene solution, there is obtained a total of 2.3 parts of crystalline N-nicotinyl-S-benzoyl-β-mercaptoethylamine, corresponding to 82 percent of the theoretical yield calculated on the nicotinic acid. By recrystallization from a mixture of benzene and ether there are obtained plate-like crystals melting at 97° C.

This substance is capable of introducing the S-acyl group into compounds containing active hydrogen in a similar manner to the compounds described in Examples 1 and 2.

The reactions described above may be represented by the following equations:

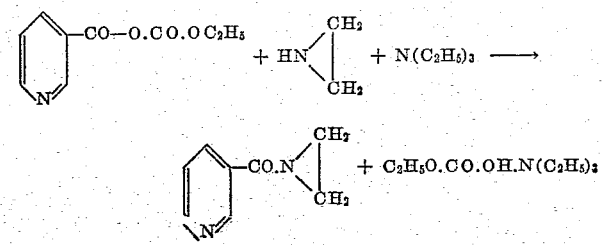

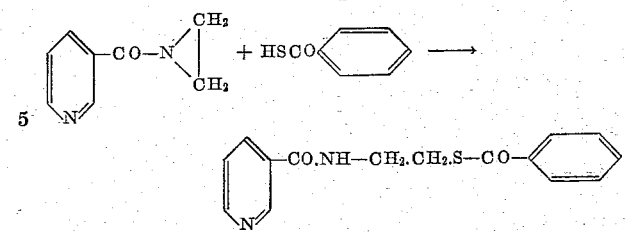

*Example 4*

10 parts of (+)-calcium-pantothenate are dissolved in 10 parts by volume of water and mixed with 10 parts by volume of triethylamine. The calcium is precipitated by means of an exactly equivalent quantity of an aqueous oxalic acid solution. After filtering and evaporation of the solvent there remain 12.5 parts of syrupy triethylammonium-pantothenate. The compound is dissolved in 25 parts by volume of dry dimethylformamide and cooled to −5° C. At this temperature, 4.1 parts of ethyl chloroformate, dissolved in 20 parts by volume of ethyl acetate, are stirred in dropwise. After 10 minutes the resulting mixture, without first separating the triethylammonium chloride which has precipitated, is rapidly added in portions while stirring to a solution, cooled to −5° C., of 2 parts of ethylene-imine and 5 parts of triethylamine in 50 parts by volume of ethyl acetate. After 20 minutes the resulting mixture is poured into a cold solution of 7 parts of thiobenzoic acid in 100 parts by volume of ethyl acetate. The mixture is allowed to stand for 30 minutes at 0° C., filtered and freed from solvent at a low temperature, first in a vacuum produced by a water jet pump, then under a high vacuum (0.05 mm. pressure of mercury). The residue is dissolved in 1000 parts by volume of water and extracted for the first time with ether (three times 500 parts by volume). The N-pantothenyl-S-benzoyl-β-mercapto-ethylamine [(+)-S-benzoyl-pantetheine] of the formula

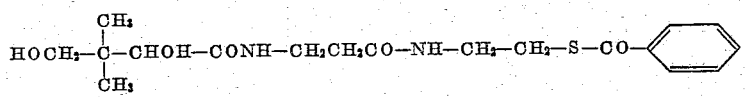

is isolated by extracting the aqueous phase with ethyl acetate (5 times 500 parts by volume) and purified by crystallization from dry ethyl acetate. The yield is 8 parts and the melting point is at 116° C. On drying with sodium sulphate and keeping in a refrigerator (at −10° C.) the ethereal extracts form a deposit of a further quantity of the crystalline compound. For analyzing, the substance is recrystallized three times from ethyl acetate and dried for 5 hours at 60° C. under a pressure of 0.05 mm. of mercury. Colorless flat needles melting at 116° C. are obtained; the specific rotation is $[\alpha]_D^{26} = +31°$ (±4°, c=1, in ethanol).

*Example 5*

In exactly the same manner as described in Example 4 in the case of N-pantothenyl-S-benzoyl-β-mercaptoethylamine, 4.7 parts of triethylammoniumpantothenate are reacted, but the thiobenzoic acid is replaced by an excess of thioacetic acid. Working up is carried out by taking up the reaction product, after it has been freed from the solvents, in 200 parts by volume of water half saturated with sodium chloride, extracting with ether and isolating the (+)-S-acetyl-pantetheine by agitation 5 times with 200 parts by volume of ethyl acetate (+10 percent methanol) each time. The combined extracts are washed with 50 parts by volume of half saturated sodium chloride solution, dried with sodium sulphate and evaporated under a vacuum produced by a water jet pump. The colorless residue weighs 4 parts. It is chromatographed in ethyl acetate over 120 parts of neutral alumina of activity IV. Six fractions, each of 100 parts of ethyl acetate, eluate 2.3 parts of N-pantothenyl-S-acetyl-β-mercapto-ethylamine [(+)-S-acetyl-pantetheine] of the formula

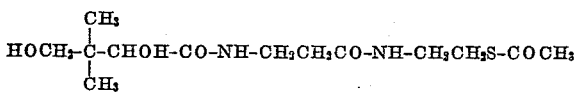

After drying over $P_2O_5$ at 25° C. for 8 hours under a pressure of 0.05 mm. of mercury the very viscous colorless syrup is analyzed. $[\alpha]_D^{26} = +40°, +38°$ (±4°; c=0.8 in ethanol.

N-pantothenyl-S-benzoyl-β-mercaptoethylamine and N-pantothenyl-S-acetyl-β-mercaptoethylamine can be reacted with hydroxyl amine to form benzhydroxamic acid or acetohydroxamic acid, respectively, according to the following equations and procedures:

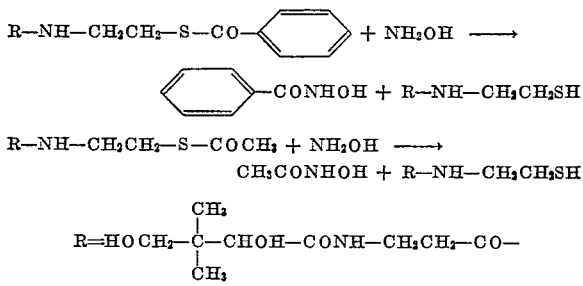

0.00604 part of N-pantothenyl-S-acetyl-β-mercaptoethylamine+0.5 part by volume of methanol+1.0 part by volume of $NH_2OH$ solution+1.0 part by volume of acetate buffer (pH=5.4) are allowed to stand at room temperature for 15 minutes, then mixed with 1.0 part by volume of HCl solution, 1.0 part by volume of $FeCl_3$ solution and 5.0 parts by volume of water. The intensity of the color produced is determined in the Lumetrone-colorimeter. The transmission is 38.7% at $\epsilon=1$ cm.; $\lambda=515$ mμ.

The intensity of the color produced by 0.00616 part N-pantothenyl-S-benzoyl-β-mercapto-ethylamine, after undergoing exactly the same treatment, is exactly the same.

By reacting N-pantothenyl-S-benzoyl-β-mercaptoethylamine with ammonia the following result is obtained:

(a) *With aqueous ammonia.*—0.100 part of (+)-S-benzoylpantetheine are dissolved in 2 parts by volume of methanol and made up to 5 parts by volume with concentrated $NH_3$ water (1:1). After 1, 6, 16 and 31 minutes at room temperature of 28° C., 1.0 part by volume of the liquid is pipetted into 9 parts by volume of 0.01-N iodine solution (in glacial acetic acid) and titrated back with 0.01-N thiosulfate to determine the amount of the mercapto compound produced.

| $t$ | Consumption of $Na_2S_2O_3$ (ml.) | Consumption of $I_2$ (ml.) | Percent Reaction |
| --- | --- | --- | --- |
| 1′ | 8.0 | 1.0 | 19 |
| 6′ | 6.4 | 2.6 | 49.5 |
| 16′ | 4.9 | 4.1 | 78 |
| 31′ | 4.0 | 5.0 | 95.5 |

0.200 part of N-pantothenyl-S-benzoyl-β-mercaptoethylamine, reacted in the same way with ammonia (during 40 minutes), after agitation with ethyl acetate, dissolution of the extract in water, treatment with animal charcoal and extraction with ethyl acetate, yields 0.060 part (=90 percent of the calculated quantity) of crystalline benzamide. After recrystallization from benzene the product melts at 125° C. and shows no depression of the mixed melting point with a comparative preparation of melting point 125° C.

(b) *With methanolic ammonia.*—0.020 part of N-pantothenyl-S-benzoyl-β-mercaptoethylamine is dissolved in 1 part by volume of methanol saturated with $NH_3$. After 2 hours S-benzoyl groups can no longer be detected with hydroxylamine and $FeCl_3$. The product is chromatographed over Whatman paper No. 1 with a mixture of butanol, water and glacial acetic acid 4:5:1 at 28° C., dried for 5 minutes at 100° C., sprayed with 2% sodium nitroprussiate, then with 2-N KCN.

Ammonolysis:
2 hours: 1 spot $R_F=0.75$
24 hours: 1 spot $R_F=0.75$
+small spot $R_F=0.47$ The $R_F$ value of the resulting substance corresponds to that of pantetheine under identical conditions; the product of further degradation ($R_F=0.47$) has not been investigated.

N-pantothenyl-S-acetyl-β-mercapto-ethylamine, when treated in an analogous manner with methanolic ammonia, becomes degraded to pantetheine.

By reaction of N-pantothenyl-S-benzoyl-β-mercaptoethylamine with an alcohol, such as methanol, the corresponding benzoic acid esters can be obtained:

0.100 part of N-pantothenyl-S-benzoyl-β-mercaptoethylamine is boiled with 3 parts by volume of methanol and 0.005 part of (anhydrous)sodium acetate for 5 hours. The whole is then mixed with 10 parts by volume of ether and the mixture thoroughly washed with water. The ethereal layer is dried with sodium sulphate and evaporated. The residue is distilled in a test tube under reduced pressure, benzoic acid-methyl ester being obtained in good yield.

0.36 part of N-(+)-pantothenyl-S-benzoyl-β-mercaptoethylamine are mixed with 1 part by volume of sodium glycinate solution and the mixture maintained at 35–40° C. for 12 hours. The mercapto compounds which has formed is then removed with ethyl acetate and the ethyl acetate extract washed with water. The aqueous portions are combined and evaporated down to a small volume. After mixing with 1 part by volume of 1-N HCl the hippuric acid formed begins to crystallize. Its melting point is at 190° C.

*Example 6*

0.9 part of N-para-toluene sulphonyl-ethylene-imine is dissolved in 8 parts by volume of ethyl acetate together with the thiolbenzoic acid prepared from 0.9 part of potassium salt of thiolbenzoic acid by acidifying with hydrochloric acid. The solution is boiled for 2 hours under reflux. Before cooling, 4 parts by volume of petroleum ether are added. Overnight 1.3 parts of N-para-toluene-sulfonyl-S-benzoyl-β-mercapto-ethyl-amine separate in the form of large flat crystals up to 1 cm. in length. It melts at 111–112° C.

The reaction is illustrated by the equation

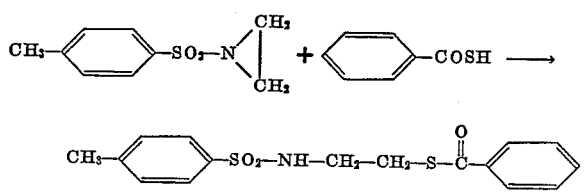

The new compound has the same acylating properties as the other afore-described N:S-diacyl derivatives of β-mercapto-ethylamine.

What is claimed is:
1. N-pantothenyl-S-benzoyl-β-mercapto-ethylamine.
2. N-pantothenyl-S-acetyl-β-mercapto-ethylamine.
3. A process according to claim 4, wherein N-pantothenyl-ethylene imine is used.
4. A process for the manufacture of mercapto-ethylamides which comprises reacting an N-acyl-ethylene-imine, wherein the acyl radical is that of an acid selected from the group consisting of saturated lower alkyl carboxylic acids, dichloracetic acid, succinic acid, pantothenic acid, benzoic acid, nicotinic acid, isonicotinic acid and p-toluene sulfonic acid, with an acid selected from the group consisting of saturated lower aliphatic thiocarboxylic acids and benzene thiocarboxylic acids.

References Cited in the file of this patent

UNITED STATES PATENTS

| 2,382,185 | Ulrich | Aug. 14, 1945 |
| 2,418,497 | Burke | Apr. 8, 1947 |
| 2,701,256 | Kuhn | Feb. 1, 1955 |

OTHER REFERENCES

Brown et al.: "JACS," vol. 75, April 5, 1953, p. 1693.
King et al.: "JACS," vol. 75, March 20, 1953, p. 1291.
Lyen et al.: "Liebig's Annalen," vol. 574 (1951), pp. 1–11.
Goldberg et al.: "J. Chem. Soc." (London), 1948, pp. 1921–22 and 1924.
Kuhn et al.: Berichte, vol. 84, pp. 844–7 (1951).
Baddily et al.: J. Chem. Soc., 1951, pp. 3425–6.
Snell et al.: JACS, vol. 72, pp. 5349–50 (1950).